(12) United States Patent
Kogan et al.

(10) Patent No.: US 6,940,203 B2
(45) Date of Patent: Sep. 6, 2005

(54) GROUNDING AND CLAMPING MEMBER FOR STATOR COIL

(75) Inventors: Viktor Kogan, Ellicott City, MD (US); James R. Pipkin, Maitland, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 56 days.

(21) Appl. No.: 10/691,933

(22) Filed: Oct. 23, 2003

(65) Prior Publication Data

US 2005/0088053 A1 Apr. 28, 2005

(51) Int. Cl.[7] .......................... H02K 3/40; H02K 15/12
(52) U.S. Cl. ..................... 310/196; 310/260; 310/270
(58) Field of Search ..................... 310/196, 260, 310/270; 174/126.4, 127, 140 CR, 73.1

(56) References Cited

U.S. PATENT DOCUMENTS

| | | | |
|---|---|---|---|
| 1,784,997 A | * | 12/1930 | Schenkel ............... 174/70 R |
| 3,679,925 A | * | 7/1972 | Fort ........................ 310/196 |
| 3,823,334 A | * | 7/1974 | Philofsky et al. ........ 310/196 |
| 3,824,683 A | * | 7/1974 | Rhudy ...................... 29/596 |
| 3,975,653 A | | 8/1976 | Kawakami et al. |
| 4,095,627 A | | 6/1978 | Lonseth et al. |
| 4,207,482 A | | 6/1980 | Neumeyer et al. |
| 4,403,163 A | | 9/1983 | Armerding et al. |
| 4,760,296 A | | 7/1988 | Johnston et al. |
| 4,831,303 A | | 5/1989 | Rowe et al. |
| 5,319,276 A | | 6/1994 | Schuler |
| 5,821,652 A | | 10/1998 | Hyypio |
| 5,925,944 A | | 7/1999 | Emery et al. |
| 6,130,496 A | * | 10/2000 | Takigawa et al. ........... 310/196 |
| 6,140,733 A | | 10/2000 | Wedde et al. |
| 6,181,042 B1 | | 1/2001 | Grant et al. |
| 6,417,456 B1 | | 7/2002 | Leijon et al. |
| 6,420,812 B1 | | 7/2002 | Emery |
| 6,498,415 B1 | | 12/2002 | Emery |

* cited by examiner

Primary Examiner—Tran Nguyen

(57) ABSTRACT

A corona suppression apparatus for a dynamoelectric machine having a stator coil (12) covered with a corona suppression covering (16), the apparatus including a member (10) conducting to ground (20) abutting a top layer (28) of the corona suppression covering proximate an overlap region (18) of the corona suppression covering. The member may be positioned in a gap (30) between the stator coil corona suppression covering and a stator core clamping finger (24) extending from the stator core proximate the stator coil. The member may also be configured to exert a compressive force on the overlap region by being compression biased between the corona suppression covering and the stator core clamping finger.

27 Claims, 2 Drawing Sheets

GROUNDING AND CLAMPING MEMBER FOR STATOR COIL

FIELD OF THE INVENTION

This invention relates generally to the field of corona suppression in dynamoelectric machines, and, more particularly, to a grounding and clamping member for a stator coil.

BACKGROUND OF THE INVENTION

It is known to suppress corona effects in stator coils of dynamoelectric machines by using outer corona protection (OCP). The OCP may include a semiconductive material wrapped around a portion of the stator coil positioned within a stator core slot. For example, the semiconductive material may include graphite or carbon black. The OCP acts as a transition "bridge" between stator coil surfaces and a grounded stator core for distributing capacitively induced currents throughout the OCP and conducting these currents to the grounded stator core, thereby reducing corona effects. In addition, it is also known to suppress corona effects in a portion of the coil positioned outside the stator core (the coil end or involute) by using graded end corona protection (ECP), such as a nonlinear resistive material wrapped around the coil end for conducting a gradient current to a ground point. For example, the ECP may comprise a silicon carbide component having a voltage dependent resistance for achieving a desired potential gradient along the coil. Typically, on a portion of the coil end adjacent to the stator core, the OCP extends away from the stator core for a distance beyond an exit end of the stator core slot. A portion of the OCP extending away from the stator core may be partially overlapped by the ECP to form an electrically conductive connection between the ECP, having a comparatively high resistivity, and the OCP, having a comparatively low resistivity.

DETAILED DESCRIPTION OF THE INVENTION

The present inventors have discovered that the overlapped area between the OCP and the ECP may exhibit excessive capacitive and gradient currents that need to be conducted to the nearest ground point. In addition, the overlap area appears to be especially sensitive to the capacitive and gradient currents that may generate detrimental local electrical arcing, accompanied by destructive ozone formation. The effects of arcing, currents, temperature, and ozone may lead to premature failure of the corona suppression treatment and, consequently, stator coil winding insulation, which may result in a catastrophic short circuit condition.

Figure 1:
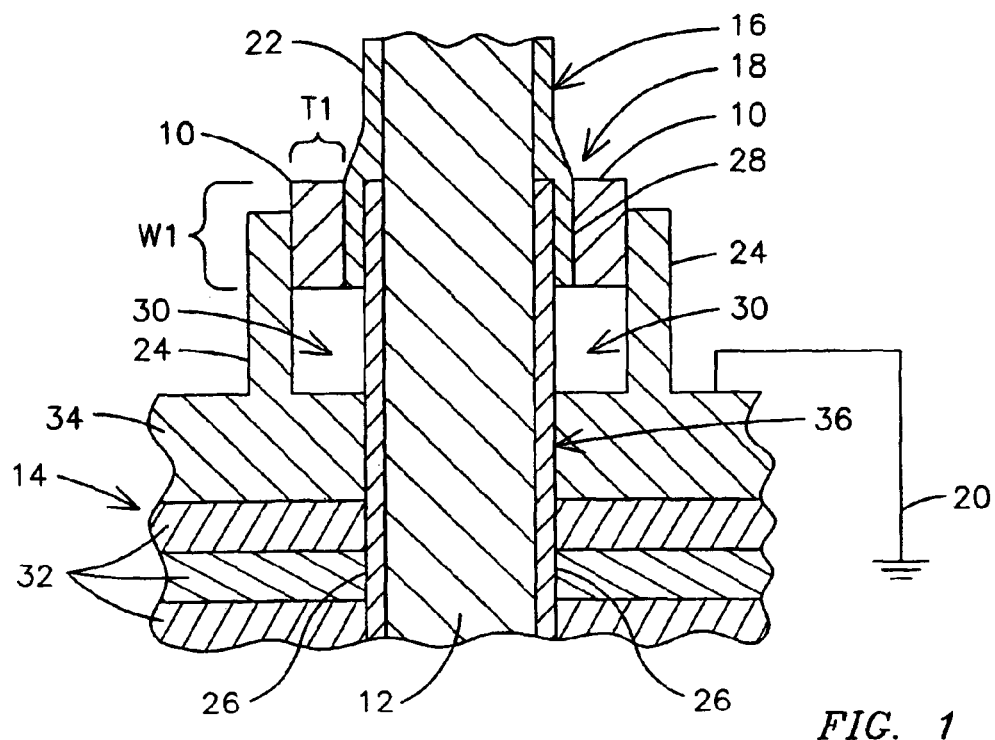
FIG. 1 is a cross sectional, partial cut-away view of an exemplary member installed around a stator coil extending from a stator core.

FIG. 1 is a cross sectional, partial cut-away view of a member 10, abutting a stator coil 12 extending from a stator core 14, for conducting to ground 20 and providing a compressive force to an overlap region 18 of the corona suppression covering 16. For example, the member 10 allows electrical charges built up in the overlap region 18 of a comparatively high resistivity stator corona suppression covering portion, or ECP 22, and a comparatively low resistivity stator corona suppression-covering portion, or OCP 26, to be conducted to ground 20, for use in an electrodynamic machine, such as a generator. It will be recognized by those skilled in the art that various embodiments of the present invention may be configured for use with a range of stator coils and stator core configurations.

In conventional corona suppression covering applications incorporating an overlap region 18, the continuity of an electrical contact in the overlap region 18 between the OCP 26 and ECP 22 is critical to the performance of the corona suppression covering 16. The inventors of the present invention have realized that a member 10 comprising a material installed around the overlap region 18 may advantageously provide a ground path for conducting corona-inducing currents flowing in the corona suppression covering 16 outside the stator core 14 to ground 20. In an aspect of the invention, the member 10 may have a resistivity within 50% to 200% of the resistivity of the OCP 26 for conducting to ground 20. In another aspect, the member 10 may have a surface resistivity of between about 1 kilo-ohms per square inch to 40 kilo-ohms per square inch. It should be appreciated by a skilled artisan that a member 10 having a comparatively lower surface resistively than about 1 kilo-ohms per square inch may begin to allow induction currents to be induced in the member 10, resulting in excessive heating and possible failure of the member 10. To achieve a desired resistivity, the member 10 may include graphite or carbon black as used in conventional OCP coverings, or may be formed from silicone, such as the silicone product number AS650, available from SiOLog, Incorporated.

The inventors have also discovered that a compressive force exerted by the member 10 to the overlap region 18 may decrease detrimental ozone formation by excluding air from around the overlap region 18, thereby preventing potential degradation of the OCP 26 and ECP 22 in the overlap region 18. In addition, it is believed that the compressive force exerted by the member 10 may also reduce the likelihood of potentially damaging microsparks from developing in the overlap region 18 by ensuring that the OCP 26 and the ECP 22 are held tightly together. For example, the compressive force exerted by the member 10 may range from about 15 pounds per square inch (psi) up to about 1500 psi. The compressive force should not exceed a level, such as 4200 psi, that degrades an insulating layer surrounding the stator coil 12 under the corona suppression covering 16. In a compressive configuration, the member 10 may be formed from an insulting material such as a polymeric compound, for example, a polyethylene compound, a polytetrafluoroethylene (PTFE) compound, a polyester compound, or polyamide compound. It should be understood by those skilled in the art the that the member should not extend, for example, more than about 50%, away from the corona suppression covering 16 into a gap 30 between the stator coil 12 covered by the corona suppression covering 16 and a stator core clamping plate finger 24 extending from the stator core 14. However, it is believed the combination of compression of the overlap region 18 and grounding of the overlap region 18 works synergistically to provide improved corona suppression. Accordingly, member 10 may be formed from a resilient material, such as silicone, which may be held in compression bias to exert a compressive force against the corona suppression covering 16, while also conducting to ground.

To achieve a desired compressive force exerted in the overlap region 18, such as against the ECP 22, the member 10 may be formed from a material having modulus of compression, E, ranging from about 300 psi to 4000 psi. A desired compressibility, δ, of the member 10 may be selected to encompass average irregularities on the ECP 22 surface, such as about 0.003 inches, to displace air between the ECP 22 and the member 10. For example, the compressibility, δ, of the member 10 may be selected to be about 5% to 35% from a free state. Accordingly, the compression, σ, (compressive force per unit of surface area) may be the evaluated using the formula (1):

$$\sigma = \delta * E. \tag{1}$$

For example, using formula (1), a member 10 formed from a silicone material having a modulus of compression, E, of 300 psi, and a compressibility, δ, of 5%, provides a compression, σ, of 15 psi.

In an aspect of the invention, the member 10 may be configured to abut a top layer 28 of the ECP 22 overlying the OCP 26 near the overlap region 18. The width, W1, of the member 10 may correspond to a width of the overlap 18, such as about 0.75 inches. In another aspect, W1 may be wider than the overlap region 18 to extend past the overlap region 18 toward the stator core 14 onto the OCP 26. In a further aspect, the width W1 may be selected so that the member 10 extends over both sides of the overlap region 18. However, extension of the member 10 away from the stator core 14 will reduce the effectiveness of the corona reduction performance of the ECP 22. For example, if the member 10 is positioned over the ECP 22 more than about 1.5 inches from the overlap region 18 in a direction away from the stator core 14, the stator coil current may be short-circuited through the ECP 22 and the member 10 to ground 20. In another aspect of the invention, W1 may be selected to be about the same as the width of the overlap region 18, without further coverage over the ECP 22 or OCP 26, so that frictional resistance between the member 10 and the overlap region 18 is reduced by keeping a contact area between the member 10 and the corona suppression covering confined to the overlap region 18. Accordingly, thermally induced movement of the stator coil 12 with respect to the member is allowed. In addition, a lubricant, such as a Teflon™ based lubricant, may be used to reduce friction between the member 10 and the overlap region 18 or other areas where the member 10 contacts the corona suppression covering 16.

As shown in FIG. 1, the member 10 may be positioned in the gap 30 between the stator coil 12 covered by the corona suppression covering 16, and a stator core clamping plate finger 24 extending from the stator core 14. In a typical generator, the stator core 14 may comprise a multitude of stacked laminations 32 clamped together at opposite ends of the stator core 14 by a clamping plate 34. The clamping plate 34 may include a multitude of clamping plate fingers 24 spaced apart with respect to stator core slots 36. In conventional corona suppression covering applications, the OCP 26 may extend approximately 0.375 inches beyond the fingers 24, and the ECP may overlap the OCP 26 by about 0.75 inches. In an aspect of the invention, the member 10 abuts the stator core clamping finger 24 to provide an electrical contact between the ECP 22, the member 10, and the finger 24 for conducting to ground 20 through the stator core 14. Advantageously, this novel configuration allows currents in the corona suppression covering 16 outside of the stator core 14, and, in particular, in the overlap region 18, to be conducted to ground 20 instead of requiring these currents to travel through the overlap region 18 into the stator core 14 for grounding, as required in conventional corona suppression techniques.

In another aspect, the member 10 is compression biased against the stator coil corona suppression covering 16 and the stator core clamping finger 24 to ensure the continuity of the electrical contact of the member 10 with the overlap 18 and the finger 24. In addition, a compressive force (such as a compressive force supplied by a member formed from a resilient material that is compressed from about 5 to 35 percent from a free state) advantageously compresses the OCP 26 and ECP 22 together in the overlap region 18 and displaces air in the gap 30 around the overlap 18, thereby helping to reduce ozone formation. For example, a thickness, T1, of the member 10 may be 0.07 inches in a free state, and 0.05 inches when compressed into the gap 30 between the stator coil corona suppression covering 16 and the stator core clamping finger 24, thereby exerting a corresponding compressive force.

The member 10 may be preformed and placed into position by biasing the stator coil 12 away from an adjacent finger 24 so that after the member 10 is positioned, the stator coil 12 is allowed to return to its unbiased state to compress the member 10 between the stator coil 12 and the finger 24. Accordingly, the member 10 is held in a biased state, exerting a compressive force against the finger 24 and the stator coil 12, for example, in the overlap region 18. In another aspect, the member 10 may be formed in place by biasing the stator coil 12 away from the adjacent finger 24, placing a removable mold (not shown) in the gap 30 to allow formation of a desired shape, and flowing a member forming material, such as room temperature vulcanizing (RTV) silicone, into the gap 30. After the material cures, the mold can be removed and the stator coil 12 is allowed to return to its unbiased state to compress the cured member 10 between the stator coil 12 and the finger 24. The member 10 may be sized so that it does not completely fill the gap 30 between the ends of the fingers 24 and the stator core clamping plate 34. Accordingly, a portion of the gap 30 may be left open to allow, for example, a cooling fluid to flow in the gap 30 between the member 10 and the clamping plate 34.

Figure 2:
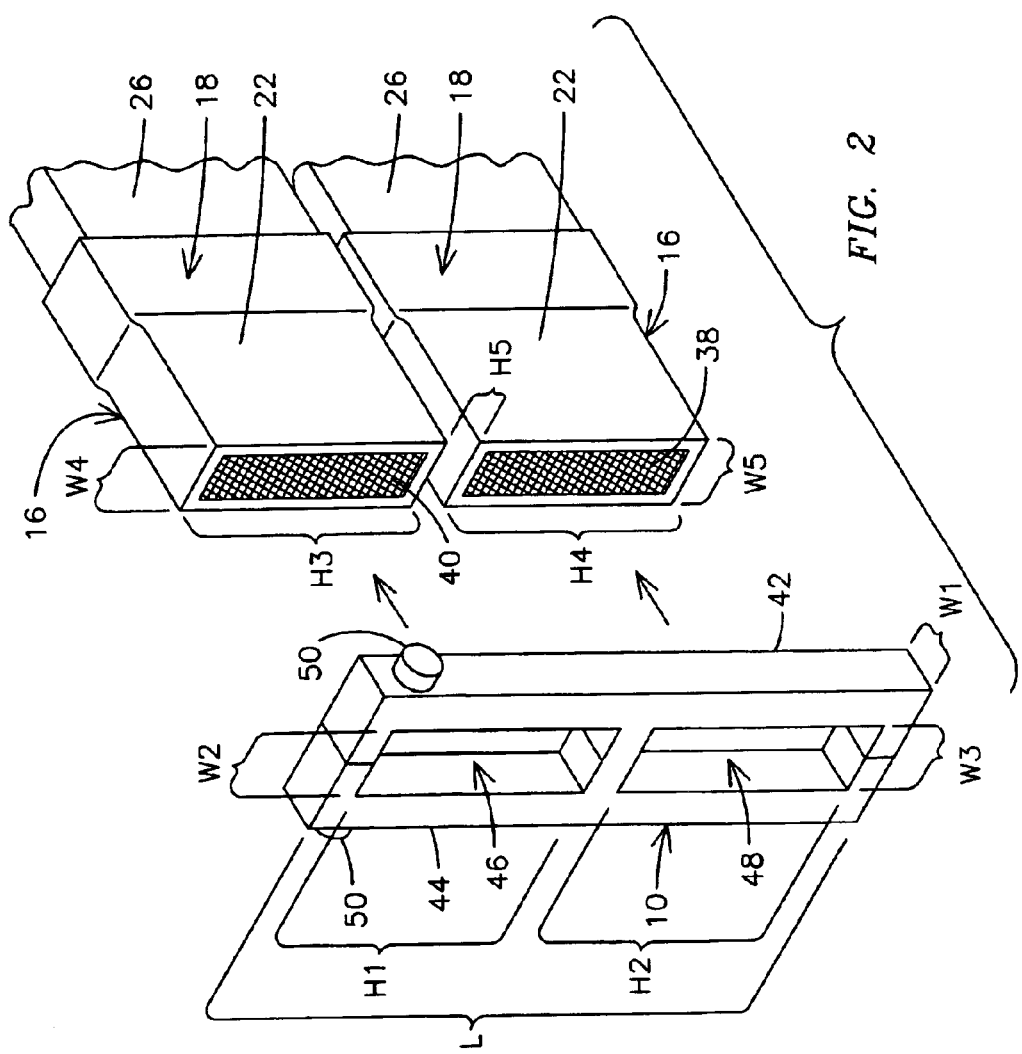
FIG. 2 is a perspective view of an exemplary member shown dissembled from an upper stator coil and a lower stator coil.

FIG. 2 is a perspective view of an exemplary member 10 shown dissembled from an upper stator coil 38 and a lower stator coil 40. As depicted in FIG. 2 the member 10 may be formed as a collar to fit around an upper stator coil 38 and a lower stator coil 40 pair around respective overlap regions 18. The member 10 may include a first portion 42 and a second portion 44 that may be symmetrically mirrored parts for assembly around the stator coils 38, 40 to ease installation. The heights H1 and H2 of the openings 46, 48 in the member 10 correspond to the heights H3, H4 respectively of the stator coils 40, 38, including the stator coil coverings 16. An axial length L may include the heights H3, H4, the height H5 of a space between the upper stator coil 38 and a lower stator coil 40, which may be filled with filler strips (not shown) used to compress the stator coils 38, 40 in stator coil slots (not shown). The widths W2 and W3 of the openings 46, 48 in the member 10 correspond to the widths W4, W5, respectively, of the stator coils 40, 38 including the stator coil coverings 16. As described previously, W1 may correspond to the width of the overlap region 18, which may vary from 0.5 inches to 1 inch.

Figure 3:
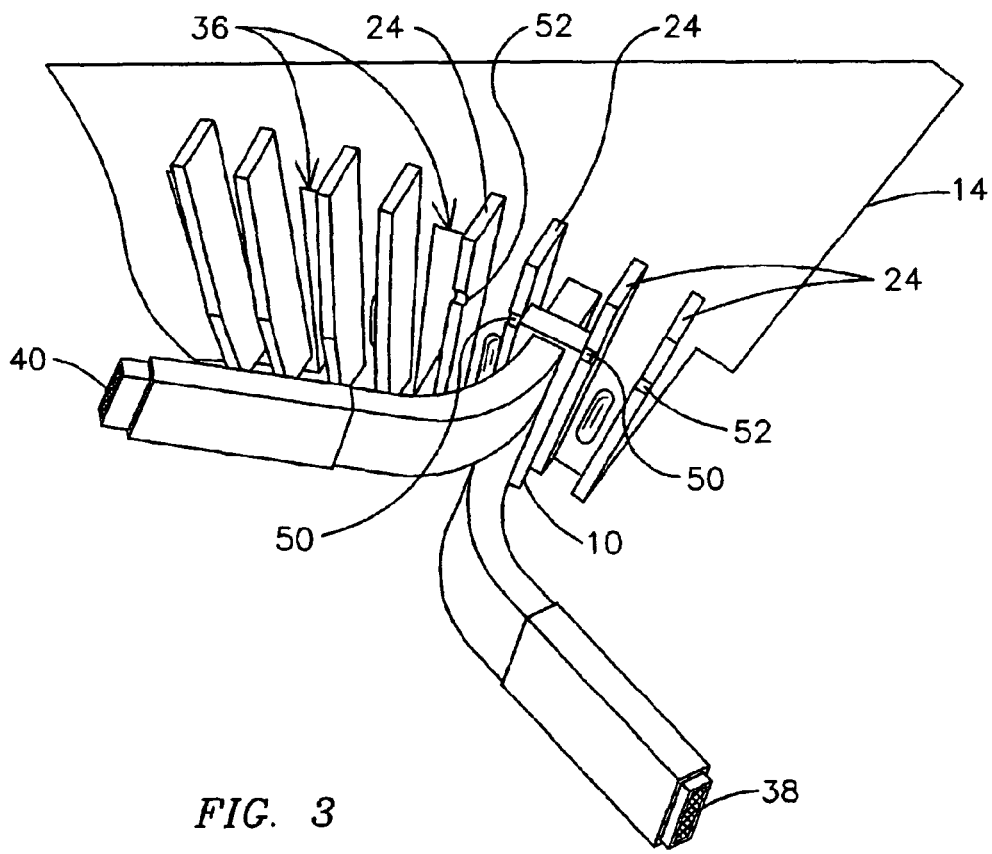
FIG. 3 is a partial cutaway perspective view of an exemplary member installed between stator core clamping fingers and around stator coils extending from a stator core.

In another aspect of the invention, the member 10 may include a protrusion, or boss 50, cooperatively associated with a recess 52, as shown in FIG. 3. FIG. 3 is a partial cutaway perspective view of an exemplary member 10 installed between the stator core clamping fingers 24 and around the stator coils 38, 40 extending from the stator core 14. The stator core clamping fingers 24 are partially cutaway along a plane intersecting the recess 52 to show how the bosses 50 of the member 10 fit in the recesses 52 to hold the member 10 in place with respect to the fingers 24. For example, the bosses 50 may be cylindrical in shape, and the recess 52 may be a complementarily shaped opening configured to receive the boss 50. It will be recognized by those skilled in the art that various embodiments for mechanically retaining the member 10 between the finger 24 and the stator coil 12 may be used. In another aspect, semiconductive glue, such as Shieldingkit™, available from Holland Shielding Systems, Incorporated, may be used to adhere the member 10 to the finger 24.

While the exemplary embodiments of the present invention have been shown and described by way of example only, numerous variations, changes and substitutions will occur to those of skill in the art without departing from the invention herein. Accordingly, it is intended that the invention be limited only by the spirit and scope of the appended claims.

What is claimed is:

1. A corona suppression apparatus for a dynamoelectric machine having a stator coil covered with a corona suppression covering that has a first covering portion and a second covering portion, the apparatus comprising a member conducting to ground abutting a top layer of the corona suppression covering proximate an overlap region of said first covering portion and second covering portion, wherein said first covering portion has a comparatively higher resistivity with respect to said second covering portion, and said second portion has a comparatively lower resistivity with respect to said first covering portion.

2. The apparatus of claim 1, the member positioned in a gap between the corona suppression covering and a stator core clamping finger extending from a stator core proximate the stator coil.

3. The apparatus of claim 2, wherein the member is compression biased between the corona suppression covering and the stator core clamping finger.

4. The apparatus of claim 3, wherein the member is compressed by about 5% to 35% from a free state.

5. The apparatus of claim 2, wherein the member comprises a protrusion cooperatively associated with a recess in the finger for positioning the member.

6. The apparatus of claim 2, wherein the dynamoelectric machine comprises two adjacent stator coil end turns covered with corona suppression coverings and the member comprises an axial length spanning a space between the two adjacent end turns to abut the corona suppression covering on each end turn.

7. The apparatus of claim 1, wherein the member comprises a resistivity within about 50% to 200% of a resistivity of the lower resistivity corona suppression covering portion.

8. The apparatus of claim 1, wherein the member comprises a surface resistivity between about 1 kilo-ohm per square inch to 40 kilo-ohms per square inch.

9. The apparatus of claim 1, wherein the member comprises a compound selected from the group consisting of graphite, carbon black, and silicone.

10. The apparatus of claim 1, wherein the member comprises a first portion and a second portion joined to form a collar positioned around the stator coil proximate the overlap region.

11. The apparatus of claim 1, wherein the top layer comprises the comparatively higher resistivity corona suppression covering portion.

12. The apparatus of claim 1, wherein the top layer comprises the comparatively lower resistivity corona suppression covering portion.

13. The apparatus of claim 1, further comprising a lubricant layer provided between the member and the top layer of the corona suppression covering.

14. A corona suppression apparatus for a dynamoelectric machine having a stator coil covered with a corona suppression covering having a first and second corona suppression covering portion, the apparatus comprising a clamping member exerting a compressive force of between about 15 pounds per square inch to 150 pounds per square inch on an overlap region between the first and second corona suppression covering portion, wherein said first corona suppression covering portion has a comparatively lower resistivity than the second corona suppression covering portion.

15. The apparatus of claim 14, the clamping member positioned in a gap between the corona suppression covering and a stator core clamping finger extending from the stator core proximate the stator coil.

16. The apparatus of claim 15, wherein the clamping member is compression biased between the corona suppression covering and the stator core clamping finger.

17. The apparatus of claim 16, wherein the clamping member is compressed by about from 5% to 35% from a free state.

18. The apparatus of claim 16, wherein the clamping member comprises a modulus of compressibility between about 300 pounds per square inch to 4000 pounds per square inch.

19. The apparatus of claim 15, wherein the clamping member comprises a protruding member cooperatively associated with a recess in the finger for positioning the member.

20. The apparatus of claim 14, wherein the clamping member comprises a semiconductive silicone compound.

21. The apparatus of claim 14, wherein the clamping member comprises an insulating polymeric compound.

22. The apparatus of claim 14, wherein the insulating polymeric compound is selected from the group consisting of a polyethylene compound, a polytetrafluoroethylene compound, a polyester compound, and a polyamide compound.

23. The apparatus of claim 14, wherein the dynamoelectric machine comprises two adjacent stator coil end turns covered with corona suppression coverings and the member comprises an axial length spanning a space between the two adjacent end turns to abut the corona suppression covering on each end turn.

24. The apparatus of claim 14, wherein the member comprises a first portion and a second portion joined to form a collar positioned around the stator coil proximate the overlap region.

25. A dynamoelectric machine comprising:
a stator core,
a stator coil extending from the stator core;
a corona suppression covering comprising an overlap region of a first and second corona suppression covering portion, wherein said first corona suppression covering portion has a comparatively lower resistivity than the second corona suppression covering portion; and
a member conducting to ground abutting the overlap region.

26. The dynamoelectric machine of claim 25, wherein the member is further positioned in a gap between the corona suppression covering and a stator core clamping finger extending from the stator core proximate the stator coil, the member abutting the stator core clamping finger.

27. The dynamoelectric machine of claim 25, wherein the member exerts a compressive force of between about 15 pounds per square inch to 150 pounds per square inch.

* * * * *